United States Patent [19]

Jones et al.

[11] Patent Number: 5,418,318
[45] Date of Patent: * May 23, 1995

[54] NAPHTHALENEDICARBOXYLIC ACID CONTAINING POLYMER/HALOGEN COMPOUND COMPOSITIONS HAVING REDUCED FLUORESCENCE

[75] Inventors: Allan S. Jones, Church Hill; David E. Mills, Kingsport, both of Tenn.; Mitchell A. Winnik, Toronto, Canada

[73] Assignee: Eastman Chemical Company, Kingsport, Tenn.

[*] Notice: The portion of the term of this patent subsequent to Feb. 21, 2012 has been disclaimed.

[21] Appl. No.: 239,015

[22] Filed: May 5, 1994

Related U.S. Application Data

[63] Continuation-in-part of Ser. No. 103,643, Aug. 9, 1993.
[51] Int. Cl.$^6$ .......................................... C08G 63/189
[52] U.S. Cl. ................................. 528/298; 528/272; 528/298; 528/299; 528/302; 528/305; 528/308.6
[58] Field of Search ............... 528/272, 298, 299, 302, 528/305, 308, 308.6

[56] References Cited

U.S. PATENT DOCUMENTS

| | | | |
|---|---|---|---|
| 4,045,513 | 8/1977 | Knopka | 524/399 |
| 4,059,546 | 11/1977 | Knopka | 524/34 |
| 4,101,528 | 7/1978 | Knopka | 524/409 |

*Primary Examiner*—Samuel A. Acquah
*Attorney, Agent, or Firm*—John D. Thallemer; John F. Stevens

[57] ABSTRACT

This invention relates to naphthalenedicarboxylic acid containing polymer compositions having reduced fluorescence. More specifically, the polymers contain at least 0.1 mole percent of a dicarboxylic acid selected from 2,6-naphthalenedicarboxylic acid or 2,6-naphthalenedicarboxylate ester, with 0.1 to 5 mole percent of a copolymerizable halogen containing aromatic compound. These polymers are useful for packaging applications where clarity and/or aesthetic appeal are of concern.

15 Claims, No Drawings

NAPHTHALENEDICARBOXYLIC ACID CONTAINING POLYMER/HALOGEN COMPOUND COMPOSITIONS HAVING REDUCED FLUORESCENCE

CROSS REFERENCE TO RELATED APPLICATIONS

This application is a continuation-in-part of application Ser. No. 08/103,643, filed Aug. 9, 1993.

FIELD OF THE INVENTION

This invention relates to naphthalenedicarboxylic acid containing polymer compositions having reduced fluorescence. More specifically, the polymers contain at least 0.1 mole percent of a dicarboxylic acid selected from 2,6-naphthalenedicarboxylic acid or 2,6-naphthalenedicarboxylate ester, with 0.1 to 5 mole percent of a copolymerizable halogen containing aromatic compound. These polymers are useful for packaging applications where clarity and/or aesthetic appeal are of concern.

BACKGROUND OF THE INVENTION

Naphthalenedicarboxylic acid is used to make extrusion and injection-molding resins because of the good heat resistance, high glass transition temperature, and gas barrier properties of naphthalenedicarboxylic acid based polymers. Polymers containing naphthalenedicarboxylic acid are used in the fabrication of various articles for household or industrial use, including appliance parts, containers, and auto parts. One major drawback of naphthalenedicarboxylic acid containing polymers, however, is their inherent bluish fluorescence. Thus, objects prepared with naphthalenedicarboxylic acid containing polymers have a hazy and bluish appearance. This phenomenon is especially of concern in the packaging of foods and beverages wherein the food or beverage inside a container made from a naphthalenedicarboxylic acid containing polymer appears unnatural.

The fluorescence of homopolymers of poly(ethylene2,6-naphthalenedicarboxylate), referred to as PEN, is known in the art. Because of the improved properties of naphthalenedicarboxylic acid containing polymers, it is desirable to incorporate small amounts of naphthalenedicarboxylic acid in polymers such as poly(ethylene terephthalate) (PET). However, copolymers containing very small amounts of naphthalenedicarboxylic acid fluoresce with intensity similar to, or in some cases greater than PEN homopolymers. Surprisingly, poly(ethylene terephthalate) modified by copolymerizing in less than 1 mole percent naphthalenedicarboxylic acid has significant visible fluorescence.

Fluorescence is a type of luminescence in which an atom or molecule emits radiation in passing from a higher to a lower electronic state. The term is restricted to phenomena in which the time interval between absorption and emission of energy is extremely short ($10^{-10}$ to $10^{-6}$ second). Fluorescence in a polymer or small molecule, occurs when a photon is emitted from an excited singlet state. Quenching of fluorescence eliminates or reduces the ability for photon emission by providing an alternative pathway for the excited state energy such as vibronic or heat loss, or intersystem crossing to the excited triplet state.

Methods to quench fluorescence in PEN have been disclosed by Chen Shangxian et al. in an article entitled, "Fluorescence Spectra Of Poly(Ethylene-2,6-Naphthalene Dicarboxylate)" which appeared in *SCIENTIA SINICA*, Vol. XXIV, No. 5, May 1981, and by CAO Ti et al. in an article entitled, "Intermolecular Excimer Interaction In Poly(Polytetramethylene Ether Glycol Aryl Dicarboxylate)" which appeared in *ACTA CHIMICA SINICA*, Vol. 42, No. 1, 1984. Both of the references disclose the use of o-chlorophenol to quench PEN fluorescence in a chloroform solution. Dissolving the PEN in a chloroform solution to disperse the fluorescence quencher therein, however, is not practical on an industrial scale because only very dilute PEN solutions can be prepared. In addition, the PEN must have a low molecular weight to dissolve in the chloroform solution.

In contrast, the present inventors have unexpectedly determined that the incorporation of 0.1 to 5 mole percent of a copolymerizable halogen containing aromatic compound in polymers containing naphthalenedicarboxylic acid significantly reduces fluorescence without deleteriously affecting the physical properties of the polymer.

SUMMARY OF THE INVENTION

Accordingly, it is one object of the present invention to provide naphthalenedicarboxylic acid containing polymer compositions with reduced fluorescence.

Accordingly, it is another object of the invention to provide naphthalenedicarboxylic acid containing polymer compositions which have reduced fluorescence and are useful in applications where good heat resistance, high glass transition temperature and gas barrier properties are required.

These and other objects are accomplished herein by a naphthalenedicarboxylic acid containing polymer composition with reduced fluorescence comprising repeat units from:

(a) a dicarboxylic acid component which comprises at least 0.1 mole percent of 2,6-naphthalenedicarboxylic acid or 2,6-naphthalenedicarboxylate esters;

(b) a diol or diamine component; and (c) 0.1 to 5 mole percent, based on 100 mole percent dicarboxylic acid and 100 mole percent diol, of a copolymerizable halogen containing aromatic compound which has at least one halogen atom directly attached to the aromatic ring.

DESCRIPTION OF THE INVENTION

The polymers of the present invention contain naphthalenedicarboxylic acid and a fluorescence quenching compound. The polymers contain repeat units from a dicarboxylic acid, a diol or a diamine, and a copolymerizable halogen containing aromatic compound. The dicarboxylic acid, component (a), consists of at least 0.1 mole percent 2,6-naphthalenedicarboxylic acid or 2,6-naphthalenedicarboxylate ester. The diol or diamine, component (b), may be any diol or diamine. The copolymerizable halogen containing aromatic compound, component (c), consists of 0.1 to 5 mole percent, based on 100 mole percent dicarboxylic acid and 100 mole percent diol or diamine, of a copolymerizable halogen containing aromatic diacid, diester, or diol. Preferably, the polymer is a polyester containing repeat units from 0.1 to 100 mole percent of 2,6-naphthalenedicarboxylic acid or 2,6-naphthalenedicarboxylate ester, and 0 to 99.9 mole percent of terephthalic acid or dimethyl terephthalate, and at least 90 mole percent ethylene glycol.

The dicarboxylic acid component of the polymer may optionally include one or more different monomers other than 2,6-naphthalenedicarboxylic acid, 2,6-naphthalenedicarboxylate ester, terephthalic acid, and dimethyl terephthalate. Such additional dicarboxylic acids include aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. Examples of dicarboxylic acids to be included with 2,6-naphthalenedicarboxylic acid or 2,6-naphthalenedicarboxylate ester are: phthalic acid, isophthalic acid, cyclohexanediacetic acid, diphenyl-4,4'-dicarboxylic acid, succinic acid, glutaric acid, adipic acid, fumaric acid, azelaic acid, sebacic acid, 2,7-naphthalenedicarboxylic acid, 1,4-cyclohexanedicarboxylic acid, resorcinoldiacetic acid, diglycolic acid, 4,4'-oxybis(benzoic) acid, biphenyldicarboxylic acid, 1,12-dodecanedicarboxylic acid, 4,4'-sulfonyldibenzoic acid, 4,4'-methylenedibenzoic acid, trans-4,4'-stilbenedicarboxylic acid, and the like. It should be understood that use of the corresponding acid anhydrides, esters, and acid chlorides of these acids is included in the term "dicarboxylic acid". The polyester may be prepared from one or more of the above dicarboxylic acids or esters.

Component (b) of the present invention is a diol or diamine. Suitable diols include cycloaliphatic diols preferably having 6 to 20 carbon atoms or aliphatic diols preferably having 3 to 20 carbon atoms. Specific examples of diols are: ethylene glycol, diethylene glycol, triethylene glycol, 1,4-cyclohexanedimethanol, propane-1,3-diol, butane-1,4-diol, pentane-1,5-diol, hexane-1,6-diol, 2,2-dimethyl-1,3-propanediol, 1,10-decanediol, 2,2,4,4-tetramethyl-1,3-cyclobutanediol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxyphenyl)-propane, and 2,2-bis-(4-hydroxypropoxyphenyl)-propane.

The polyester may also contain small amounts of trifunctional or tetrafunctional comonomers such as trimellitic anhydride, trimethylolpropane, pyromellitic dianhydride, pentaerythritol, and other polyester forming polyacids or diols generally known in the art.

Naphthalenedicarboxylic acid containing polyamides can be formed from adipic acid, isophthalic acid, terephthalic acid, 1,3- or 1,4-cyclohexanedicarboxylic acid, aliphatic diacids containing 6 to 12 carbon atoms, aliphatic amino acids or lactams with 6 to 12 carbon atoms, 1,6-hexanediamine, meta- or para-xylylenediamine, 1,3- or 1,4-cyclohexane(bis)methylamine, aliphatic diamines with 4 to 12 carbon atoms, and other polyamide forming diacids and diamines. The polymer may be prepared from one or more of the above diols or diamines.

The polymer may also contain polycarbonate repeat units formed from the reaction of a carbonic acid derivative with a diol such as bisphenol A. The polymer may be a blend of the above-described polyesters, polyamides, polycarbonates, or polyesteramides.

Component (c) of the present invention is 0.1 to 5 mole percent, preferably 0.5 to 2 mole percent of a fluorescence quenching compound. Using more than 5 mole percent of the fluorescence quenching compound hinders the crystallization of the polyester and results in inferior physical properties. The fluorescence quenching compound is a copolymerized halogen containing aromatic compound which is copolymerized in the poly(ethylene-2,6-naphthalene dicarboxylate) backbone. The copolymerized halogen containing aromatic compound contains an aromatic ring selected from benzene, naphthalene and biphenyl.

At least two polymerizable groups are attached to the aromatic ring. Preferably, two polymerizable groups are attached to the aromatic ring. The polymerizable groups are carboxylic acids or esters and/or aliphatic hydroxyl groups. The carboxylic ester has the formula:

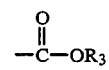

wherein $R_3$ is selected from a substituted and unsubstituted $C_1$-$C_6$ alkyl group and a substituted and unsubstituted phenyl group. $C_1$-$C_6$ unsubstituted and substituted alkyl groups represented by $R_3$ include straight or branched chain fully saturated hydrocarbon radicals and these substituted with one or more of the following: $C_5$-$C_7$ cycloalkyl, and $C_5$-$C_7$ cycloalkyl substituted with one or two of $C_1$-$C_6$ alkyl, $C_1$-$C_6$ alkoxy or halogen. The substituted phenyl groups represent such phenyl groups substituted by one or two of $C_1$-$C_6$ alkyl. Preferably $R_3$ is methyl.

The aliphatic hydroxyl group has the formula: $(CH_2)_nOH$ wherein n is an integer from 1 to 6, preferably n is 2. Preferred aromatic ring compounds containing polymerizable groups are terephthalic acid, isophthalic acid, and 2,6-naphthalenedicarboxylic acid. The most preferred is 2,6-naphthalenedicarboxylic acid.

In addition to the polymerizable groups, the aromatic ring contains at least one halogen atom selected from bromine, chlorine, iodine or combinations thereof but not chlorine alone. The halogen atoms can be attached to any of the unsubstituted positions on the aromatic rings. Preferred copolymerizable halogen containing aromatic compounds include dimethyl iodoterephthalate (iodo terephthalic acid), dimethyl 4-bromo-2,6-naphthalenedicarboxylate, (4-bromo-2,6-naphthalenedicarboxylic acid), dimethyl 1-bromo 2,6-naphthalenedicarboxylate, dimethyl 3-bromo 2,6-naphthalenedicarboxylate, dimethyl 1-iodo 2,6-naphthalenedicarboxylate, dimethyl 3-iodo 2,6-naphthalenedicarboxylate, dimethyl 4-iodo 2,6-naphthalenedicarboxylate, dimethyl 2,3-dibromoterephthalate, dimethyl 2,5-dibromoterephthalate, dimethyl tribromoterephthalate, dimethyl tetrabromoterephthalate, dimethyl 2-bromo-5-chloroterephthalate, dimethyl 2-bromo-6-chloroterephthalate, dimethyl 2-bromo-5-iodoterephthalate, dimethyl 2-bromo-6-iodoterephthalate, dimethyl 2-benzoyl-5-bromoterephthalate, dimethyl 2-benzoyl-6-bromoterephthalate, dimethyl 2-benzoyl-5-iodoterephthalate, and dimethyl 2-benzoyl-6-iodoterephthalate.

Many other ingredients can be added to the compositions of the present invention to enhance the performance properties of the polyester. For example, surface lubricants, denesting agents, stabilizers, antioxidants, ultraviolet light absorbing agents, mold release agents, metal deactivators, colorants such as black iron oxide and carbon black, nucleating agents, phosphate stabilizers, zeolites, fillers, and the like, can be included herein. All of these additives and the use thereof are well known in the art. Any of these compounds can be used so long as they do not hinder the present invention from accomplishing its objects.

The naphthalenedicarboxylic acid containing polymer with the fluorescence quenching compound is prepared by conventional polycondensation procedures well-known in the art which generally include a combination of melt phase and solid state polymerization. Melt phase describes the molten state of the naphthalenedicarboxylic acid containing polymer during the initial polymerization process. The initial polymerization process includes direct condensation of the naphthalenedicarboxylic acid with the diol or diamine or by ester interchange using naphthalenedicarboxylic ester. For example, dimethyl-2,6-naphthalenedicarboxylate is ester interchanged with ethylene glycol at elevated temperatures in the presence of the copolymerizable halogen containing aromatic compound and a catalyst. The melt phase is concluded by extruding the naphthalenedicarboxylic acid polymer into strands and pelletizing. Optionally, the copolymerizable halogen containing aromatic compound can be melt blended with the naphthalenedicarboxylic acid containing polymer.

The naphthalenedicarboxylic acid containing polymer with the fluorescence quenching compound may optionally be solid state polymerized. Solid state polymerization involves heating the polymer pellets to a temperature in excess of 200° C., but well below the crystalline melt point, either in the presence of an inert gas stream or in a vacuum to remove a diol. Several hours are generally required in the solid state polymerized unit to build the molecular weight.

Typical catalysts which may be used include titanium alkoxides, dibutyl tin dilaurate, combinations of zinc, manganese, or magnesium acetates or benzoates with antimony oxide or antimony triacetate.

The inherent viscosity of the naphthalenedicarboxylic acid containing polymer should be 0.3 to 1.5 dL/g. However, inherent viscosities of from 0.5 to 0.9 are preferred, as measured at 25° C. using 0.50 grams of polymer per 100 ml of a solvent consisting of 60% by weight phenol and 40% by weight tetrachloroethane.

The naphthalenedicarboxylic acid containing polymer compositions serve as excellent starting materials for the production of moldings of all types. The naphthalenedicarboxylic acid containing polymers may also be blended with other polymers. Specific applications include food packaging such as bottles, trays, lids and films, medical parts, appliance parts, automotive parts, tool housings, recreational and utility parts. The molding compositions of the present invention are especially useful in applications that require transparent molded parts. Additionally, the polymers can be used to prepare extruded sheets for thermoforming applications. The polymers are readily extruded into films or processed into monolayer or multilayer food and beverage containers. Potential methods for producing containers include: (1) injection stretch blow molding using either one or two stage technology, (2) injection blow molding, (3) extrusion blow molding, (4) pipe extrusion, and (5) co-injection or coextrusion where the polymers can serve as either the structural layer or barrier layer depending upon end use requirements. Fibers, melt-blown webs, extruded sheets, vacuum-drawn trays/parts, Injection molded parts, and extrusion coated wires may also be made from these polymers.

The materials and testing procedures used for the results shown herein are as follows:

Fluorescence Intensity was determined using a Perkin-Elmer LS5B Luminescence Spectrometer which measured relative fluorescence intensity at peak maxima.

The composition of the polyesters was determined using H-NMR spectroscopy (JEOL 270 Mhz). Solutions (2.5% weight/volume) in 70/30 $CDC_3/CF_3COOD$ were scanned 256 times. A delay of 10 seconds was used with a pulse width of 3.4 microseconds (5.0 microseconds, 90°).

Crystallization half-times ($t_{\frac{1}{2}}$) were determined by differential scanning calorimetry (DSC) using a Perkin-Elmer DSC II instrument. The $t_{\frac{1}{2}}$ was determined by the following method: The sample was heated to 300° C. under a nitrogen atmosphere and held for two minutes. The sample was removed from the DSC and immediately cooled to −20° C. The DSC was cooled to 50° C. and the sample was returned to the DSC. The temperature of the DSC was increased at a rate of 320° C./minute to a test temperature of 190° C., 210° C. or 230° C. Samples were isothermally crystallized at each of the test temperatures. The crystallization half-time ($t_{\frac{1}{2}}$) is the time required to reach the peak on the crystallization exotherm.

Inherent viscosity (I.V.) was measured at 25° C. using 0.50 grams of polymer per 100 ml of a solvent consisting of 60% by weight phenol and 40% by weight tetrachloroethane.

Sample preparation for determining fluorescence intensity involved grinding the polyester samples to 3–4 mm. The samples were micropulverized in an analytical grinding mill and passed through a 120 mesh screen. The powders were dried for 24 hours at 140° C. Approximately 0.5 grams of the powder was packed into a sample holder and measurements were taken by reflectance. The excitation wavelength was 350 nm and the emission maximum was 428–432 nm unless listed otherwise. The values are reported as normalized to poly(ethylene-2,6-naphthalenedicarboxylate) (fluorescence intensity 100). The fluorescence intensity of poly(ethylene-2,6-naphthalenedicarboxylate) was repeated 10 times with a standard deviation of 5.0. Two measurements were taken of all other samples and the averages are reported in Table I.

The present invention will be further illustrated by a consideration of the following examples, which are intended to be exemplary of the invention. All parts and percentages in the examples are on a weight basis unless otherwise stated.

EXAMPLE 1

Poly(ethylene 2,6-naphthalene dicarboxylate) was prepared by the following procedure.

Dimethyl 2,6-naphthalene dicarboxylate (0.5 moles, 122 grams), ethylene glycol (1.0 moles, 62 grams), and catalyst metals were placed in a 500 mL polymerization reactor under a nitrogen atmosphere. The mixture was heated with stirring at 200° C. for 2 hours. The temperature was increased to 220° C. and maintained for 1 hour. The temperature was increased to 290° C. which took approximately 20 minutes. When the temperature reached 290° C., the nitrogen flow was stopped and vacuum was applied. The polymer was stirred under vacuum (0.1–0.3 mm Hg) for 50 minutes. The polymer was cooled and ground. The fluorescence intensity and

EXAMPLE 2

Poly(ethylene 2,6-naphthalene dicarboxylate) with 1.0 mole percent copolymerized dimethyl 4-bromo-2,6-naphthalene dicarboxylate was prepared by the following procedure.

Dimethyl 2,6-naphthalene dicarboxylate (0.49 moles, 119.56 grams), dimethyl 4-bromo-2,6-naphthalene dicarboxylate (0.0050 moles, 1.62 grams), ethylene glycol (1.0 mole, 62.0 grams), and catalyst metals were placed in a 500 mL polymerization reactor under a nitrogen atmosphere. The polymer was prepared according to the procedure as set forth in Example 1. The fluorescence intensity and I.V. of the polymer are summarized in Table I, and $t_{\frac{1}{2}}$ are listed in Table II.

EXAMPLE 3

Poly(ethylene 2,6-naphthalene dicarboxylate) with 1.0 mole percent copolymerized dimethyl iodoterephthalate was prepared by the following procedure.

Dimethyl 2,6-naphthalene dicarboxylate (0.495 moles, 120.78 grams), dimethyl iodoterephthalate (0.0053 moles, 1.70 grams), ethylene glycol (1.0 mole, 62.0 grams), and catalyst metals were placed in a 500 mL polymerization reactor under a nitrogen atmosphere. The polymer was prepared according to the procedure as set forth in Example 1. The fluorescence intensity and I.V. of the polymer are summarized in Table I, and $t_{\frac{1}{2}}$ are listed in Table II.

EXAMPLE 4

Poly(ethylene 2,6-naphthalene dicarboxylate) with 2.0 mole percent of copolymerized dimethyl iodoterephthalate was prepared by the following procedure.

Dimethyl 2,6-naphthalene dicarboxylate (0.49 moles, 119.56 grams), dimethyl iodoterephthalate (0.010 moles, 3.2 grams), ethylene glycol (1.0 mole, 62.0 grams), and catalyst metals were placed in a 500 mL polymerization reactor under a nitrogen atmosphere. The polymer was prepared according to the procedure as set forth in Example 1. The fluorescence intensity and I.V. of the polymer are summarized in Table I, and $t_{\frac{1}{2}}$ are listed in Table II.

EXAMPLE 5

Poly(ethylene 2,6-naphthalene dicarboxylate) with 4.0 mole percent copolymerized dimethyl iodoterephthalate was prepared by the following procedure.

Dimethyl 2,6-naphthalene dicarboxylate (0.48 moles, 117.12 grams), dimethyl iodoterephthalate (0.0196 moles, 6.26 grams), ethylene glycol (1.0 mole, 62.0 grams), and catalyst metals were placed in a 500 mL polymerization reactor under a nitrogen atmosphere. The polymer was prepared according to the procedure as set forth in Example 1. The fluorescence intensity and I.V. of the polymer are summarized in Table I, and $t_{\frac{1}{2}}$ are listed in Table II.

TABLE I

| EXAMPLE | HALOGEN COMPOUND (mole %) | I.V. (dL/g) | FLUORESCENCE INTENSITY (at 430 nm) |
|---|---|---|---|
| 1 | PEN control | 0.42 | 100 |
| 2 | PEN + 1.0% 4-bromo-DMN[1] | 0.47 | 58 |
| 3 | PEN + 1.0% iodo-DMT[2] | 0.49 | 73 |
| 4 | PEN + 2.0% iodo-DMT[2] | 0.35 | 58 |
| 5 | PEN + 4.0% iodo-DMT[2] | 0.28 | 41 |

[1]dimethyl 4-bromo-2,6-naphthalene dicarboxylate
[2]dimethyl iodoterephthalate

The results in Table I indicate that the poly(ethylene-2,6-naphthalene dicarboxylate) compositions containing a critical range of a copolymerizable halogen containing compound as a fluorescence quencher, which is copolymerized in the PEN backbone, exhibit significantly less fluorescence than PEN compositions without the fluorescence quencher. In addition, the data in Table I also indicates that the use of the fluorescence quencher in a critical amount does not deleteriously effect the inherent viscosity of the polyester.

TABLE II

| EXAMPLE | HALOGEN COMPOUND (mole %) | $t_{\frac{1}{2}}$ (minutes) | | |
|---|---|---|---|---|
| | | 190° C. | 210° C. | 230° C. |
| 1 | PEN control | 2.5 | 1.5 | 2.5 |
| 2 | PEN + 1.0% 4-bromo-DMN[1] | 4.6 | 3.1 | 6.1 |
| 3 | PEN + 1.0% iodo-DMT[2] | 2.5 | 1.7 | 3.1 |
| 4 | PEN + 2.0% iodo-DMT[2] | 2.5 | 1.7 | 3.6 |
| 5 | PEN + 4.0% iodo-DMT[2] | 3.9 | 2.8 | 7.2 |

[1]dimethyl 4-bromo-2,6-naphthalene dicarboxylate
[2]dimethyl iodoterephthalate

The results in Table II establish the critical range for the copolymerizable halogen containing aromatic compounds as fluorescence quenchers which are copolymerized in the poly(ethylene-2,6-naphthalene dicarboxylate) backbone. The data indicates that 0.1 to 5 mole percent of the copolymerizable halogen containing aromatic compounds reduce fluorescence without deleteriously effecting the physical properties of the polyester. In contrast, greater than 5 mole percent of the copolymerizable halogen containing aromatic compounds in the compositions slows down the crystallization rate to an unacceptable level.

EXAMPLE 6

Dimethyl 4-bromo-2,6-naphthalene dicarboxylate was prepared by the following procedure.

Dimethyl-2,6-naphthalene dicarboxylate (35 grams, 0.14 moles), mercuric oxide (62 grams, 0.29 moles), carbon tetrachloride (1050 mL), and methylene chloride (700 mL) were placed in a three liter flask fitted with a mechanical stirrer, continuous addition funnel, and reflux condenser. After reflux was achieved, bromine (45.7 grams, 0.029 moles) was added dropwise followed by dropwise addition of concentrated sulfuric acid (28 mL). After 5 hours, the reaction mixture was filtered hot and the solid material was extracted five times with methylene chloride. Extracts were combined with the filtrate. The solution was then shaken with 1N sodium bisulfite to remove bromine. The organic solution was evaporated to dryness and the orange solid was purified by sublimation (150° C., 0.05 mm Hg), recrystallization (acetone) and column chromatography (toluene, $SiO_2$) to afford an off-white solid (3.5 grams, 8%). The dimethyl 4-bromo-2,6-naphthalene dicarboxylate was determined to be pure by gas chromatography with a melting point of 183°–184° C. A molecular weight of 323 was confirmed by Field Desorption Mass Spectroscopy (FDMS).

EXAMPLE 7

Poly(ethylene terephthalate) containing 5 mole percent copolymerized dimethyl 2,6-naphthalenedicarboxylate was prepared by the following procedure.

Dimethyl terephthalate (0.713 mol, 138.2 g), dimethyl 2,6-naphthalenedicarboxylate (0.0375 mol, 9.15 g), ethylene glycol (1.5 mol, 93.0 g), and catalyst metals were placed in a 0.5 L polymerization reactor under a nitrogen atmosphere. The mixture was heated with stirring at 200° C. for 90 min. The temperature was increased to 220° C. and maintained for 90 min. The temperature was increased to 285° C., the nitrogen flow was stopped and vacuum was applied. The polymer was stirred under vacuum (0.3 mm Hg) for 30 minutes. The polymer was cooled and ground. The polymer had 0.43 dL/g I.V. Fluorescence data are summarized in Table III.

EXAMPLE 8

Poly(ethylene terephthalate) containing 5 mole percent copolymerized dimethyl 2,6-naphthalenedicarboxylate and 3.0 mole percent copolymerized dimethyl iodoterephthalate was prepared by the following procedure.

Dimethyl terephthalate (0.69 mol, 133.9 g), dimethyl 2,6-naphthalenedicarboxylate (0.0375 mol. 9.15 g), ethylene glycol (1.5 mol, 93.0 g), dimethyl iodoterephtalate (0.0225 mol, 7.20 g), and catalyst metals were placed in a 0.5 L polymerization reactor under a nitrogen atmosphere. The mixture was heated with stirring at 200° C. for 90 min. The temperature was increased to 220° C. and maintained for 90 min. The temperature was increased to 285° C., the nitrogen flow was stopped and vacuum was applied. The polymer was stirred under vacuum (0.3 mm Hg) for 25 minutes. The polymer was cooled and ground. The polymer had 0.40 dL/g I.V. Fluorescence data are summarized in Table III.

EXAMPLE 9

Poly(ethylene terephthalate) containing 25 mole percent copolymerized dimethyl 2,6-naphthalenedicarboxylate was prepared by the following procedure.

Dimethyl terephthalate (0.563 mol, 109.1 g), dimethyl 2,6-naphthalenedicarboxylate (0.187 mol, 45.7 g), ethylene glycol (1.5 mol, 93.0 g), and catalyst metals were placed in a 0.5 L polymerization reactor under a nitrogen atmosphere. The mixture was heated with stirring at 200° C. for 90 min. The temperature was increased to 220° C. and maintained for 90 min. The temperature was increased to 285° C., the nitrogen flow was stopped and vacuum was applied. The polymer was stirred under vacuum (0.3 mm Hg) for 24 minutes. The polymer was cooled and ground. The polymer had 0.36 dL/g I.V. Fluorescence data are summarized in Table III.

EXAMPLE 10

Poly(ethylene terephthalate) containing 25 mole percent copolymerized dimethyl 2,6-naphthalenedicarboxylate and 3.0 mole percent copolymerized dimethyl iodoterephthalate was prepared by the following procedure.

Dimethyl terephthalate (0.54 mol, 104.8 g), dimethyl 2,6-naphthalenedicarboxylate (0.187 mol. 45.7 g), ethylene glycol (1.5 mol, 93.0 g), dimethyl iodoterephthalate (0.0225 mol, 7.20 g), and catalyst metals were placed in a 0.5 L polymerization reactor under a nitrogen atmosphere. The mixture was heated with stirring at 200° C. for 90 min. The temperature was increased to 220° C. and maintained for 90 min. The temperature was increased to 285° C., the nitrogen flow was stopped and vacuum was applied. The polymer was stirred under vacuum (0.3 mm Hg) for 28 minutes. The polymer was cooled and ground. The polymer had 0.45 dL/g I.V. Fluorescence data are summarized in Table III.

EXAMPLE 11

Poly(butylene 2,6-naphthalenedicarboxylate) containing 30 mole percent copolymerized 1,4-cyclohexanedimethanol was prepared by the following procedure.

Dimethyl 2,6-naphthalenedicarboxylate (0.5 mol, 122.0 g), 1,4-butanediol (0.7 mol, 63.0 g), 1,4-cyclohexanedimethanol (0.15 mol, 21.6 g) and catalyst metals were placed in a 0.5 L polymerization reactor under a nitrogen atmosphere. The mixture was heated with stirring at 200° C. for 90 min. The temperature was increased to 220° C. and maintained for 90 min. The temperature was increased to 260° C., the nitrogen flow was stopped and vacuum was applied. The polymer was stirred under vacuum (0.3–0.5 mm Hg) for 8 minutes. The polymer was cooled and ground. The polymer had 0.41 dL/g I.V. Fluorescence data are summarized in Table III.

EXAMPLE 12

Poly(butylene 2,6-naphthalenedicarboxylate) containing 30 mole percent copolymerized 1,4-cyclohexanedimethanol and 3.0 mole percent copolymerized dimethyl iodoterephthalate was prepared by the following procedure.

Dimethyl 2,6-naphthalenedicarboxylate (0.485 mol, 118.3 g), 1,4-butanediol (0.7 mol, 63.0 g), 1,4-cyclohexanedimethanol (0.15 mol, 21.6 g), dimethyl iodoterephthalate (0.015 mol, 4.80 g) and catalyst metals were placed in a 0.5 L polymerization reactor under a nitrogen atmosphere. The mixture was heated with stirring at 200° C. for 90 min. The temperature was increased to 220° C. and maintained for 90 min. The temperature was increased to 260° C., the nitrogen flow was stopped and vacuum was applied. The polymer was stirred under vacuum (0.3–0.5 mm Hg) for 8 minutes. The polymer was cooled and ground. The polymer had 0.42 dL/g I.V. Fluorescence data are summarized in Table 0.

EXAMPLE 13

Poly(butylene 2,6-naphthalenedicarboxylate) was prepared by the following procedure.

Dimethyl 2,6-naphthalenedicarboxylate (0.5 mol, 122.0 g), 1,4-butanediol (1.0 mol, 90.1 g), and catalyst metals were placed in a 0.5 L polymerization reactor under a nitrogen atmosphere. The mixture was heated with stirring at 200° C. for 90 min. The temperature was increased to 220° C. and maintained for 90 min. The temperature was increased to 285° C., the nitrogen flow was stopped and vacuum was applied. The polymer was stirred under vacuum (0.3 mm Hg) for 5 minutes. The polymer was cooled and ground. The polymer had 0.62 dL/g I.V. Fluorescence data are summarized in Table III.

EXAMPLE 14

Poly(ethylene 2,6-naphthalenedicarboxylate) containing 25 mole percent copolymerized dimethyl terephthalate was prepared by the following procedure.

Dimethyl 2,6-naphthalenedicarboxylate (0.563 mol, 137.3 g), dimethyl terephthalate (0.187 mol, 36.4 g), ethylene glycol (1.5 mol, 93.0 g), and catalyst metals were placed in a 0.5 L polymerization reactor under a nitrogen atmosphere. The mixture was heated with stirring at 200° C. for 90 min. The temperature was increased to 220° C. and maintained for 90 min. The temperature was increased to 285° C., the nitrogen flow was stopped and vacuum was applied. The polymer was stirred under vacuum (0.3 mm Hg) for 25 minutes. The polymer was cooled and ground. The polymer had 0.38 dL/g I.V. Fluorescence data are summarized in Table III.

EXAMPLE 15

Poly(ethylene 2,6-naphthalenedicarboxylate) containing 50 mole percent copolymerized dimethyl terephthalate was prepared by the following procedure.

Dimethyl 2,6-naphthalenedicarboxylate (0.375 mol, 91.5 g), dimethyl terephthalate (0.375 mol, 72.7g), ethylene glycol (1.5 mol, 93.0 g), and catalyst metals were placed in a 0.5 L polymerization reactor under a nitrogen atmosphere. The mixture was heated with stirring at 200° C. for 90 min. The temperature was increased to 220° C. and maintained for 90 min. The temperature was increased to 285° C., the nitrogen flow was stopped and vacuum was applied. The polymer was stirred under vacuum (0.3 mm Hg) for 30 minutes. The polymer was cooled and ground. The polymer had 0.39 dL/g I.V. Fluorescence data are summarized in Table III.

EXAMPLE 16

Poly(ethylene terephthalate) was prepared by the following procedure.

Dimethyl terephthalate (0.75 mol, 145.5 g), ethylene glycol (1.5 mol, 93.0 g), and catalyst metals were placed in a 0.5 L polymerization reactor under a nitrogen atmosphere. The mixture was heated with stirring at 200° C. for 60 min. The temperature was increased to 215° C. and maintained for 60 min. The temperature was increased to 285° C., the nitrogen flow was stopped and vacuum was applied. The polymer was stirred under vacuum (0.3–0.5 mm Hg) for 30 minutes. The polymer was cooled and ground. The polymer had 0.35 dL/g I.V. Fluorescence data are summarized in Table III.

EXAMPLE 17

Poly(ethylene terephthalate) containing 1 mole percent copolymerized dimethyl 2,6-naphthalenedicarboxylate was prepared by the following procedure.

Dimethyl terephthalate (0.743 mol, 144.1 g), dimethyl 2,6-naphthalenedicarboxylate (0.0075 mol, 1.83 ), ethylene glycol (1.5 mol, 93.0 g), and catalyst metals were placed in a 0.5 L polymerization reactor under a nitrogen atmosphere. The mixture was heated with stirring at 200° C. for 90 min. The temperature was increased to 220° C. and maintained for 90 min. The temperature was increased to 285° C., the nitrogen flow was stopped and vacuum was applied. The polymer was stirred under vacuum (0.3 mm Hg) for 40 minutes. The polymer was cooled and ground. The polymer had an I.V. of 0.52 dL/g. Fluorescence data are summarized in Table III.

TABLE III

| EX. | Polymer composition | Halo Aromatic (mole %) | Relative Fluorescence Intensity | Maximum Wavelength (nm) |
|---|---|---|---|---|
| 7 | PET + 5% DMN | None | 181 | 383 |
| 8 | PET + 5% DMN | 3% Iodo-DMT | 53 | 384 |
| 9 | PET + 25% DMN | None | 85 | 418 |
| 10 | PET + 25% DMN | 3% Iodo-DMT | 27 | 411 |
| 11 | PBN + 30% CHDM | None | 64 | 421 |
| 12 | PBN + 30% CHDM | 3% Iodo-DMT | 34 | 427 |
| 13 | PBN | None | 74 | 428 |
| 14 | PEN + 25% DMT | None | 110 | 429 |
| 15 | PEN + 50% DMT | None | 102 | 431 |
| 16 | PET | None | 21 | 388 |
| 17 | PET + 1% DMN | None | 241 | 380 |

DMN = dimethyl 2,6-naphthalenedicarboxylate
I-DMT = dimethyl iodoterephthalate
PBN = poly(butylene 2,6-naphthalenedicarboxylate)
CHDM = 1,4-cyclohexanedimethanol
PET = poly(ethylene terephthalate)

The results in Table III clearly indicate that naphthalenedicarboxylic acid containing polymers have a significant fluorescence intensity even when naphthalenedicarboxylic acid is a minor component. Unexpectedly, PET copolymerized with as little as 1 mole percent naphthalenedicarboxylate has a greater fluorescence intensity than PEN homopolymer. The results also indicate that the haloaromatic additives of this invention effectively reduce fluorescence intensity in a broad composition range of naphthalenedicarboxylic acid containing polymers.

Many variations will suggest themselves to those skilled in this art in light of the above detailed description. All such obvious modifications are within the full intended scope of the appended claims.

What is claimed is:

1. A naphthalenedicarboxylic acid containing polymer composition with reduced fluorescence consisting essentially of repeat units from:
   (a) a dicarboxylic acid component which comprises 0.1 to less than 85 mole percent of 2,6-naphthalenedicarboxylic acid or 2,6-naphthalenedicarboxylate esters;
   (b) a diol or diamine component; and
   (c) 0.5 to 2 mole percent, based on 100 mole percent dicarboxylic acid and 100 mole percent diol, of a difunctional halogen containing aromatic compound which has at least one halogen atom directly attached to the aromatic ring.

2. A naphthalenedicarboxylic acid containing polymer composition with reduced fluorescence consisting essentially of repeat units from:
  (a) a dicarboxylic acid component which comprises 0.1 to 50 mole percent of 2,6-naphthalenedicarboxylic acid or esters thereof, and 50 to 99.9 mole percent of terephthalic acid or esters thereof; and
  (b) a diol component; and
  (c) 0.5 to 2 mole percent, based on 100 mole percent dicarboxylic acid and 100 mole percent diol, of a difunctional halogen containing aromatic compound which has at least one halogen atom directly attached to the aromatic ring.

3. The composition of claim 2 wherein the diol component, component (b), is at least 95 mole percent ethylene glycol.

4. The composition of claim 1 wherein the difunctional halogen containing aromatic compound has an aromatic ring selected from the group consisting of benzene, naphthalene and biphenyl.

5. The composition of claim 4 wherein the aromatic ring contains at least two polymerizable groups selected from the group consisting of carboxylic esters, aliphatic hydroxyl groups and combinations thereof.

6. The composition of claim 5 wherein the carboxylic ester has the formula:

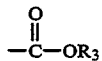

wherein $R_3$ is selected from the group consisting of a $C_1$-$C_6$ alkyl group and a phenyl group.

7. The composition of claim 6 wherein the carboxylic ester has the formula:

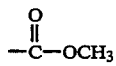

8. The composition of claim 5 wherein the aliphatic hydroxyl group has the formula:

$(CH_2)_nOH$ wherein n is an integer from 1 to 6.

9. The composition of claim 7 wherein the aliphatic hydroxyl group is $(CH_2)_2OH$.

10. The composition of claim 5 wherein the aromatic ring compound is selected from the group consisting of terephthalic acid, isophthalic acid, 2,6-naphthalenedicarboxylic acid and the ester derivatives thereof.

11. The composition of claim 10 wherein the aromatic ring compound is 2,6-naphthalenedicarboxylic acid or ester.

12. The composition of claim 4 wherein the aromatic ring contains at least one halogen atom selected from the group consisting of bromine, iodine, chlorine, and combinations thereof, provided that chlorine is not the only halogen atom on the aromatic ring.

13. The composition of claim 1 wherein the difunctional halogen containing aromatic compound is selected from the group consisting of dimethyl iodoterephthalate, dimethyl 4-bromo-2,6-naphthalenedicarboxylate, dimethyl 1-bromo 2,6-naphthalenedicarboxylate, dimethyl 3-bromo 2,6-naphthalenedicarboxylate, dimethyl 1-iodo 2,6-naphthalenedicarboxylate, dimethyl 3-iodo 2,6-naphthalenedicarboxylate, dimethyl 4-iodo 2,6-naphthalenedicarboxylate, dimethyl 2,3-dibromoterephthalate, dimethyl 2,5-dibromoterephthalate, dimethyl tribromoterephthalate, dimethyl tetrabromoterephthalate, dimethyl 2-bromo-5-chloroterephthalate, dimethyl 2-bromo-6-chloroterephthalate, dimethyl 2-bromo-5-iodoterephthalate, dimethyl 2-bromo-6-iodoterephthalate, dimethyl 2-benzoyl-5-bromoterephthalate, dimethyl 2-benzoyl-6-bromoterephthalate, dimethyl 2-benzoyl-5-iodoterephthalate, and dimethyl 2-benzoyl-6-iodoterephthalate.

14. The composition of claim 13 wherein the difunctional halogen containing aromatic compound is dimethyl 4-bromo-2,6-naphthalene dicarboxylate.

15. The composition of claim 14 wherein the difunctional halogen containing aromatic compound is dimethyl iodoterephthalate.

* * * * *